Patented June 17, 1930

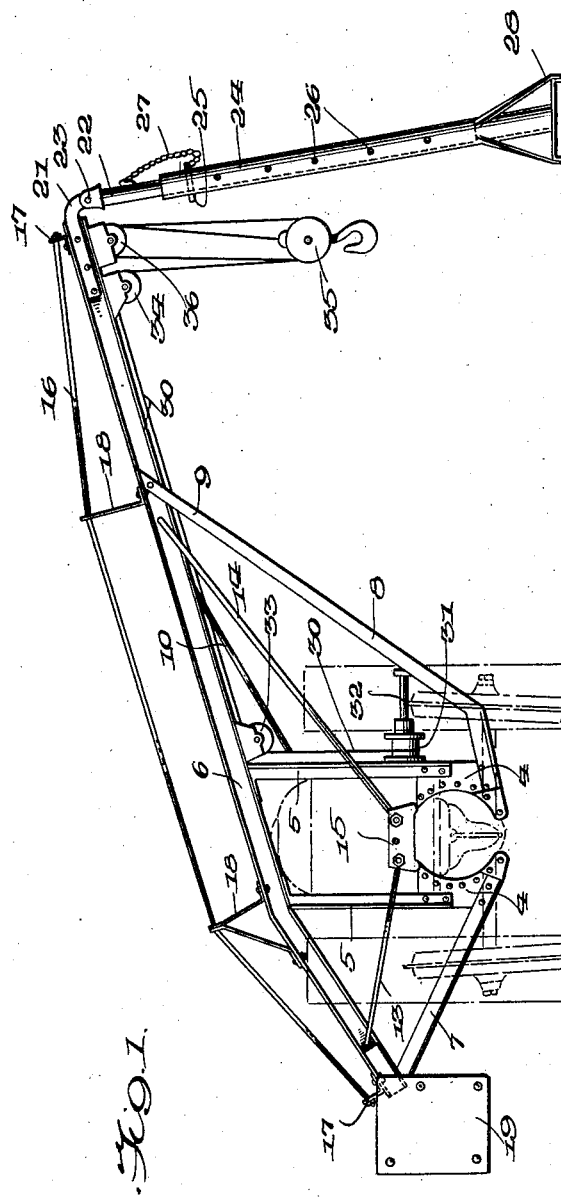

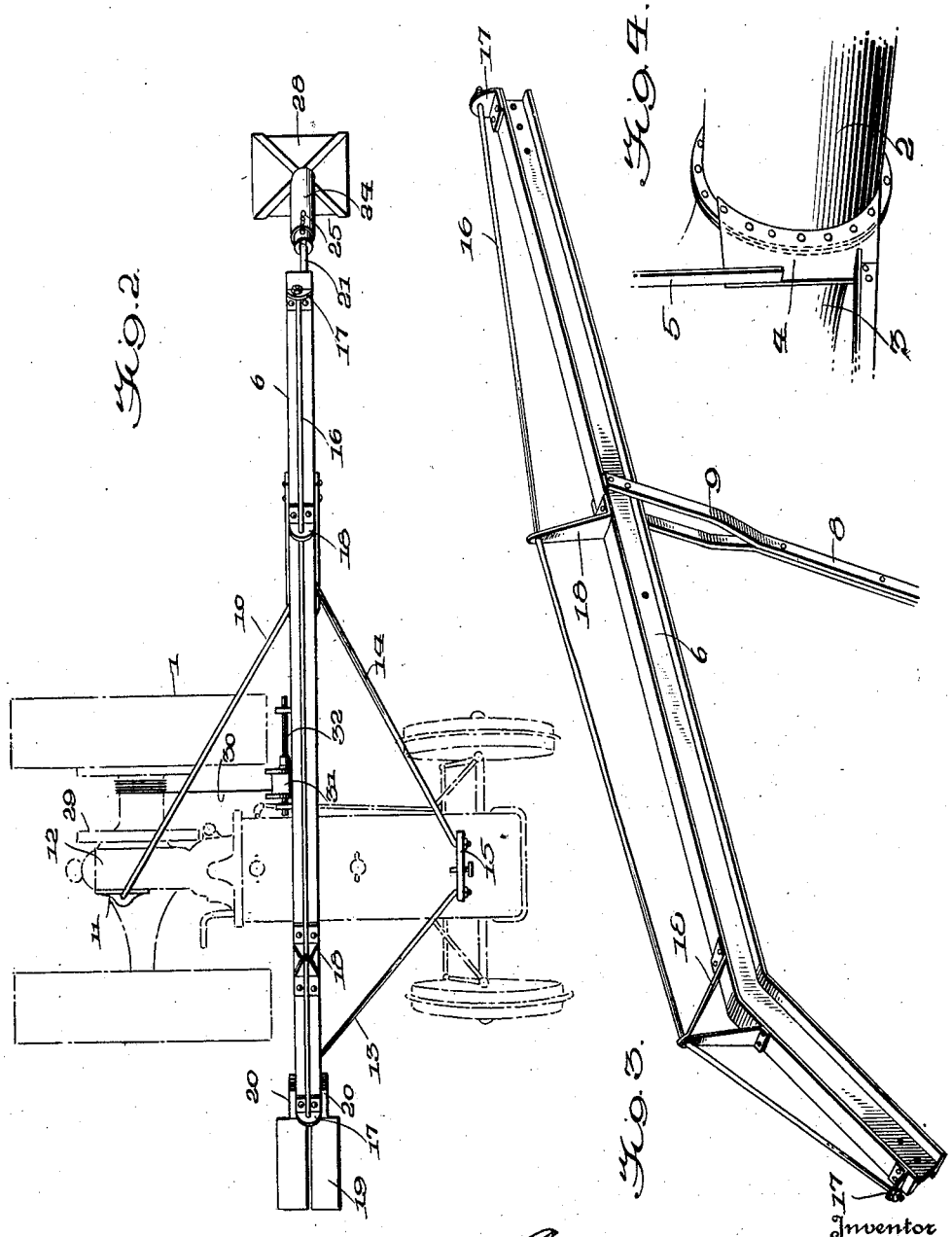

1,765,295

UNITED STATES PATENT OFFICE

FRED G. BECKMAN, OF MUSKOGEE, OKLAHOMA

TRACTOR BOOM CRANE

Application filed August 1, 1927. Serial No. 209,874.

This invention relates to an improvement in tractor boom cranes, completely assembled as a unit, and installed on a Fordson tractor.

An object of my invention is to provide a complete tractor boom crane to be used in connection with a hoist which in turn is operated by a Fordson tractor to raise and lower objects of any kind, more especially to be used in connection with the laying of water mains and sewer pipes, etc.

A further object of my invention is to provide a self contained portable boom crane in connection with a hoist and a mobile unit so that heavy objects or loads may be hoisted and moved from one point to another.

The invention provides a horizontally disposed H beam, held in position by upwardly extending supports, the lower ends of which are fastened to the girth of the tractor by means of two side plates at the point where the transmission case is bolted to engine housing. Right and left boom supports or arms, are each attached to the plate at one end and the H beam boom at the other so as to further stabilize the same on the one end and to fix the lower end.

A telescopic stiff-leg supports the outer end of boom, when abnormal weights or loads are being lifted and when the tractor is being used as a stationary unit.

Counter-balance weights are bolted to the lower end of the boom crane for the purpose of counter-balancing normal loads when being used as a mobile unit.

Front and rear truss anchors are arranged on the top, at each end of the H beam boom and front and rear queen posts intermediate thereof, to carry a truss rod running the full length of the boom to further stabilize the same. Side sway braces are provided to take care of any side or sway movement of the boom when carrying loads and used as a mobile unit. Double and single blocks are mounted on the boom to carry the pulling line from the end of the boom to the cable drum. This arrangement shortens the height of the boom and prevents tangling of lines, adding to the life of same.

In the accompanying drawings,

Fig. 1 is a side elevation of the invention as applied to a tractor, the latter being shown in dotted lines;

Fig. 2 is a top plan view of the same;

Fig. 3 is a perspective view of the boom;

Fig. 4 is a detail perspective view showing the attachments of the side plate; and Fig. 5 is a detail perspective view of the counterweights applied to the end of the boom.

The invention is especially designed for use with a Fordson tractor and is constructed so that it may be easily attached to or disconnected from the tractor, but when so attached a strong and rigid support is provided for the boom crane. The tractor is shown in dotted lines and is designated generally by the numeral, 1. 2 indicates the transmission case which is bolted to the engine housing, 3, as shown in Fig. 4. These are the conventional parts of the Fordson tractor.

Side plates, 4, are secured upon the opposite sides of the tractor, as illustrated in Figs. 1 and 4, by being bolted thereto at the point where the transmission case is bolted to the engine housing. Vertical supports, 5, extend upwardly from the side plates, 4, and are bolted or otherwise secured thereto. On their upper ends, the vertical supports, 5, have an H beam boom, 6, secured thereto and they serve as the principal supporting means for this boom. The boom extends approximately horizontally but slightly inclined, as shown in Fig. 1, although the exact position or relation of the boom to the tractor is not especially material. Right and left outer arms, 7 and 8, extend laterally and upwardly from the lower portion of the side plates, 4, and have their upper ends secured rigidly to the boom, 6, the outer arm, 7, being attached to the inner end of the boom whereas, the outer arm, 8, is forked as at 9, and embraces the boom intermediate its ends, as shown especially in Fig. 3.

A sway brace, 10, extends from a rear brace bracket, 11, secured to the transmission case, 12, of the tractor, 1, and has its forward end attached to one side of the boom, 6, in order to brace the boom against backward swaying action especially when carrying heavy loads. For the same purpose, front sway braces, 13 and 14, extend from remote points of the boom to a front brace bracket, 15, attached at a point near the front of the tractor, these sway braces being firmly and rigidly attached to the boom and brace and prevent any swaying action of the boom.

A truss rod, 16, has its opposite ends secured to the truss anchors, 17, mounted upon the opposite ends of the boom, 6, and this truss rod extends through queen posts, 18, in order to further stabilize the boom. Counter weights, 19, are secured to the inner end of the boom, 6, by means of flanges, 20, as shown in Fig. 5 for the purpose of counter-balancing normal loads carried by the boom when used as a mobile unit. At the forward end of the boom, 6, an approximately L shaped plate, 21, is secured by bolts or rivets or other suitable attaching means and has a shaft, 22, pivoted thereto as at 23. The shaft, 22, depends from the plate, 21, and is telescopically received within a stiff-leg, 24. A pin, 25, extends through openings, 26, in the stiff-leg, 24, and through a corresponding opening in the shaft, 22, in order to securely hold these members in their proper adjusted positions relative to each other. A chain, 27, has an end thereof secured to the shaft, 22, and carries the pin, 25. A foot piece, 28, is secured to the lower end of the stiff-leg, 24, and is adapted to be seated on the ground in order to hold the stiff-leg in its proper position and to support the end of the boom when used in a stationary position for lifting heavy loads.

A drum, 29, may be mounted upon the tractor but in any suitable position and is preferably driven by means of a jack shaft or other driving mechanism, not shown. A rope, 30, is wound on to the drum, 29, and passes around a single sheave, 31, mounted on a shaft, 32, which in turn is carried by suitable bearings in the vertical support, 5, and outer arm, 8. The rope, 30, passes from the sheave, 31, to and around a sheave, 33, and over a single sheave, 34, at the forward end of the boom, 6, whence it passes around a block, 35, and another sheave, 36, its free end being attached to the block, 35, as shown in Fig. 1. The block, 35, may have any suitable means attached thereto or connected therewith or with the sheaves, 34 or 36, for lifting, transporting or carrying pipe, gas mains, wheels or any other elements desired to be moved by means of this crane.

The invention is removably applied to a Fordson tractor and may be used in connection with a hoisting attachment carried thereby, so that the rope drum of the hoisting attachment may be used as a source of power for elevating supporting or moving the elements desired to be moved by means of this crane.

The Fordson tractor with the invention applied thereto is especially useful in laying water or gas mains where it may be driven along the side of the ditch into which the mains are intended to be laid and it either lifts the pipe into or out of such ditch, greatly simplifying the operation and decreasing the time and expense thereof.

The invention forms a strong and rigid support for the boom of the crane, allowing it to be used either while the tractor is traveling or stationary. The telescopic stiff-leg, 24, may be adjusted as to height and serves to rigidly support the outer free end of the boom when the crane is used, while the tractor is in a stationary position for lifting heavy or abnormal loads.

I claim:

1. A boom crane including a boom, side plates adapted to be attached to a tractor and carried thereby and upwardly extending supports carried by the side plates and attached at their upper ends to the boom in spaced apart relation.

2. A boom crane including a boom, side plates adapted to be attached to a tractor and carried thereby and upwardly extending supports carried by the side plates and attached at their upper ends to the boom in spaced apart relation, and outer arms connected with and extending outwardly from the side plates and secured to the boom for supporting and bracing the same.

3. A boom crane including a boom, side plates adapted to be carried by a tractor, upwardly extending supports carried by the side plates and connected with the boom in spaced apart relation, brace brackets adapted to be connected with the tractor and sway braces connecting the brackets with the opposite sides of the boom for preventing swaying thereof.

4. A boom crane including a boom, side plates adapted to be carried by a tractor, upwardly extending supports carried by the side plates and connected with the boom in spaced apart relation, brace brackets adapted to be connected with the tractor and sway braces connecting the brackets with the opposite sides of the boom for preventing swaying thereof, a truss rod extending longitudinally of the boom for bracing the length thereof, supporting means carried by the boom to support the truss rod and counter-weights attached to the inner end of the boom.

5. The combination with a motor vehicle having a crank case, of side plates secured on opposite sides of said crank-case and extending laterally therefrom in planes at angles to the crank case, a boom, and supporting and bracing means extending between the boom and side plates.

6. The combination with a motor vehicle having a power device, of side plates secured on opposite sides of said power device and extending laterally therefrom in planes approximately at right-angles to the length of the power device, a boom extending transversely of and above the tractor, and bracing members extending from the boom and connected with the side plates for supporting and bracing the boom therefrom.

7. The combination with a tractor, of a boom extending transversely of and above the tractor, outer arms extending laterally and upwardly from the opposite sides of the tractor and connected with the boom, and sway braces connected with the boom and extending to and connected with the front and back portions of the tractor.

8. The combination with a tractor, of a boom extending transversely of and above the tractor, outer arms extending laterally and upwardly from the opposite sides of the tractor and connected with the boom, sway braces extending from the boom on opposite sides of the tractor to the front portion of said tractor and secured thereto, and a sway brace extending from the boom to the rear portion of the tractor and secured thereto.

In testimony whereof I affix my signature.

FRED G. BECKMAN.